(12) United States Patent
Song et al.

(10) Patent No.: US 9,507,171 B2
(45) Date of Patent: Nov. 29, 2016

(54) METHOD FOR TINTING AN OPTICAL FILM BY THERMAL TRANSFER PRINTING

(75) Inventors: Lixin Song, Singapore (SG); Yu Richard Liu, Singapore (SG)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 807 days.

(21) Appl. No.: 13/989,009

(22) PCT Filed: Nov. 25, 2011

(86) PCT No.: PCT/EP2011/071075
§ 371 (c)(1),
(2), (4) Date: May 22, 2013

(87) PCT Pub. No.: WO2012/072520
PCT Pub. Date: Jun. 7, 2012

(65) Prior Publication Data
US 2013/0244045 A1 Sep. 19, 2013

(30) Foreign Application Priority Data

Dec. 1, 2010 (EP) .................................... 10306330

(51) Int. Cl.
*G02C 7/02* (2006.01)
*B05D 5/06* (2006.01)
*B41M 5/52* (2006.01)
*C09D 101/14* (2006.01)
*B41M 5/00* (2006.01)
*B41M 7/00* (2006.01)

(52) U.S. Cl.
CPC .............. *G02C 7/022* (2013.01); *B05D 5/061* (2013.01); *B41M 5/52* (2013.01); *C09D 101/14* (2013.01); *B41M 5/0052* (2013.01); *B41M 5/0064* (2013.01); *B41M 7/009* (2013.01); *Y10T 428/31663* (2015.04)

(58) Field of Classification Search
CPC .... G02C 7/022; B05D 5/061; C09D 101/14; B41M 5/0052; B41M 5/0064; B41M 7/009
See application file for complete search history.

(56) References Cited

U.S. PATENT DOCUMENTS

| | | | |
|---|---|---|---|
| 5,393,725 A | 2/1995 | Abe et al. | |
| 5,789,067 A * | 8/1998 | Mizumachi | .......... B41M 7/0027 428/195.1 |
| 5,834,398 A | 11/1998 | Mochizuki et al. | |
| 2007/0039682 A1* | 2/2007 | Drake | .................. B41M 5/0064 156/230 |

FOREIGN PATENT DOCUMENTS

| | | |
|---|---|---|
| EP | 0 544 301 A1 | 6/1993 |
| EP | 1 683 645 A1 | 7/2006 |

* cited by examiner

*Primary Examiner* — Nicole M Buie-Hatcher
(74) *Attorney, Agent, or Firm* — Young & Thompson

(57) ABSTRACT

The present invention relates to a method for tinting optical films comprising: (a) coating onto an optical film a liquid coating composition comprising, in a water miscible organic solvent, 1 part of cellulose acetate butyrate (CAB), from 0.1 to 2 parts by weight of dicyclohexyl phthalate, from 0.1 to 1 part by weight of isocyanato-alkyltrialcoxysilane, and at least 0.5 moles of $H_2O$ per mole of hydrolysable alcoxy groups of isocyanatoalkyltrialcoxysilane, (b) submitting said coated composition to a drying step so as to form an image-receiving CAB layer on the optical film, (c) printing the dried image-receiving CAB layer with a sublimation dye by means of a thermal transfer printer, (d) submitting the resulting printed film and image-receiving CAB layer to a thermal treatment so as to transfer the printed sublimation dye from the image-receiving layer to the underlying optical film, and (e) removing the image-receiving CAB layer by means of a suitable solvent. The present invention is also drawn to a tinted optical film obtained by such a method, an optical article containing such a film and a liquid coating composition for implementing the method.

11 Claims, No Drawings

METHOD FOR TINTING AN OPTICAL FILM BY THERMAL TRANSFER PRINTING

The present invention relates to a method for tinting optical films comprising a step of thermal transfer printing. The present invention also relates to tinted optical films obtained by such a method, to optical articles, such as ophthalmic lenses, containing these tinted optical films and to a liquid coating composition for forming a washable, image-receiving layer usable in the method of the present invention.

It is known to directly tint organic glass ophthalmic lenses by immersing the lens substrate, optionally covered with a primer layer and/or with a hard-coat, into a hot bath of disperse dye. Such direct dying methods are however always operator-dependent. Furthermore, easily tintable hard-coats generally suffer from poor scratch resistance and easily printable primers from poor substrate adhesion resulting in peeling off issues.

An alternative method for manufacturing tinted ophthalmic lenses is to first prepare tinted optical plastic films which could then be adhered, for example by pressure sensitive adhesives or hot melt adhesives, onto non tinted lens substrates. Such a method would be especially interesting if it allowed the use of known printing methods and available printers, such as thermal transfer printing methods on photoprinters. As a matter of fact developing a process for thermal transfer printing optical films would allow for creation of nearly any coloured pattern on optical substrates, especially ophthalmic lenses, using rather common printing devices such as thermal transfer printers.

EP 1 683 645 describes a method of tinting optical lenses, said method comprising coating the substrate of an optical lens with a porous ink-receiving layer, applying by ink-jet printing an aqueous ink onto said ink-receiving layer, heating the optical lens with the printed ink-receiving layer to transfer the dye from said layer to the underlying substrate, and then removing the ink-receiving layer. This method involves ink-jet printing onto the lens and consequently requires specific ink-jet printers.

U.S. Pat. No. 5,393,725 is drawn to a thermal transfer printing method comprising coating onto a plastic film, such as PET film, an image-receiving layer preferably made of cellulose ester resin, and printing an image onto said image-receiving layer by means of a thermal transfer printer (CVP-G500 of Sony Co., Ltd). The image-receiving layer, unlike the ink-receiving layer of EP 1 683 645, is not removed after printing and contains the image-forming sublimation dye. To impart satisfying mechanical strength to said image-receiving layer, a polyfunctional crosslinking agent (Takenate D110N, a adduct of trimethylolpropane carbamate with xylylene diisocyanate) is added to the image-receiving layer composition. The films obtained by the method of U.S. Pat. No. 5,393,725 can not be used as optical films to be adhered to ophthalmic lenses since they have poor transparency due to the dye-containing image-receiving layer which is not removed after printing.

U.S. Pat. No. 5,834,398 also is drawn to a sublimation thermal transfer receiving material having a cross-linked image-receiving layer. As for U.S. Pat. No. 5,393,725, the image-receiving layer is a permanent layer and is not removed after thermal transfer printing and the resulting printed films are not suitable for being adhered onto ophthalmic lens substrates since they lack transparency.

The object of the present invention is to provide a method for printing optical films using a thermal transfer method and printer, said method not suffering from the prior art inconvenience resulting from the haze of the image-receiving layer.

The idea underlying the present invention was to temporarily coat an image-receiving layer (as in EP 1 683 645 discussed above) onto an optical film substrate, and to remove said image-receiving layer after thermal transfer printing of a sublimation dye and a thermal treatment step transferring at least part of the sublimation dye from the image-receiving layer into the underlying optical film substrate. After said second thermal transfer step, at least part of the dye is no longer in the image-receiving layer. This layer can then be removed from the substrate, leaving a coloured pattern or image in the underlying optical film substrate. Removing the image-receiving layer suppresses any problem related to insufficient transparency.

To easily remove the image-receiving layer by means of non aggressive solvents, it was necessary to find a suitable "curing" agent which would impart sufficient mechanical strength to the image-receiving layer during the first thermal transfer printing step in a thermal transfer printer and which would not prevent washing off the image-receiving layer after transferring of the sublimation dye, in a second thermal transfer step, to the underlying transparent optical film substrate.

It has been found that isocyanatotrialcoxysilanes provide suitable mechanical resistance and good washability to a temporary image-receiving layer.

The present invention is drawn to a method for tinting optical films comprising the following successive steps:
(a) coating onto an optical film a liquid composition comprising, in a water miscible organic solvent,
   1 part of cellulose acetate butyrate (CAB),
   0.1 to 2 parts by weight, preferably 0.15 to 1 part by weight, of dicyclohexyl phthalate,
   0.1 to 1 part by weight, preferably 0.15 to 0.8 part by weight, of isocyanatoalkyltrialcoxysilane, and
   at least 0.5 moles, preferably from 0.8 to 5 moles, of $H_2O$ per mole of hydrolysable alcoxy groups of isocyanatoalkyltrialcoxysilane,
(b) submitting said coated composition to a drying step so as to form an image-receiving CAB layer on the optical film,
(c) printing the dried image-receiving CAB layer with a sublimation dye by means of a thermal transfer printer,
(d) submitting the resulting printed film and image-receiving CAB layer to a thermal treatment so as to transfer the printed sublimation dye from the image-receiving layer to the underlying optical film, and
(e) removing the image-receiving CAB layer by means of a suitable solvent.

The liquid composition coated in step (a) onto the optical film must be a clear solution of the components in the solvent. Possible insoluble residues have to be eliminated before coating. The coating of the liquid composition may be carried out according to any known coating method. The preferred coating method is spin coating.

The cellulose acetate butyrate is commonly used in image-receiving layers for sublimation thermal transfer recording mediums. The weight average molecular weight of the cellulose acetate butyrate is advantageously comprised between 8 000 and 150 000, preferably between 10 000 and 70 000. The cellulose acetate butyrate must have a degree of esterification allowing complete dissolution into the water miscible solvent used for the liquid coating composition. Its degree of acetylation may range for example from 2 to 30% and its degree of butyration from 17 to 60%.

Such cellulose acetate butyrates are commercially available for example from Eastman Kodak, under the designations of CAB551-a01, CAB551-0.2, CAB551-0.2, CAB531-1, CAB500-1, CAB-500-5, CAB-553-0.4, CAB-381-2, CAB-381-0.1, CAB-381-0, CAB-381-0.5BP, CAB-381-2, CAB-381-2BP, CAB-381-20, CAB381-20BP and CAB-171-15S. Cellulose acetate butyrate (for example CAS No 9004-36-8) is also available from Sigma-Aldrich.

The use of dicyclohexyl phthalate in permanent image-receiving layers is known to increase the dye affinity of thermal transfer image-receiving layers. This compound is available for example from Osaka Organic Chem. Co., Ltd.

The isocyanatoalkyltrialcoxysilane advantageously is selected from isocyanato($C_{1-3}$ alkyl)tri($C_{1-3}$ alcoxy)silanes, i.e. it has only lower alkyl and alcoxy groups having from 1 to 3 carbon atoms. The alcoxy groups preferably are methoxy and ethoxy groups. The applicants have obtained excellent results with isocyanatopropyltriethoxysilane. This third component of the liquid coating composition has only one isocyanate group and therefore will not lead to highly cross-linked CAB layers, thereby allowing easy removal of the temporary image receiving layer at the end of the method of the present invention, by means of a suitable solvent. Thanks to its three hydrolysable alcoxysilane groups it however undergoes a sol-gel reaction (hydrolysis/condensation). Without wishing to be bound by any theory, it is believed that the three-dimensional Si—O-network formed by this third component imparts sufficient mechanical strength to the image receiving layer during the first thermal transfer step (printing step (c)) of the method of the present invention.

Step (a) and step (e) use a solvent to respectively dissolve all the components of the liquid coating composition or to dissolve and eliminate the image-receiving layer after the thermal treatment of step (d).

As mentioned before, the solvent in step (a) must be miscible with water. Lower alcohols such as methanol or ethanol, in spite of their water miscibility, cannot be used for step (a) alone since they generally do not dissolve CAB. Preferred solvents for preparing the liquid coating composition of step (a) are selected from acetone, methyl ethyl ketone, ethyl acetate, and tetrahydrofurane.

These solvents may also be advantageously used for step (e). The removal of the image receiving layer may however also be implemented with suitable solvents which are not miscible with water such as toluene/ethanol mixtures or methylene chloride/isopropyl mixtures.

The skilled person will of course understand that the solvents in steps (a) and (e) must be completely inert towards the optical film to be printed. Even partial swelling of the underlying optical film by the solvent could lead to undesirable haze or optical defects in the final tinted film.

Any known transparent polymer film may be used as the optical film in the present invention.

A preferred optical film is a poly(ethylene terephthalate) film, but one could as well use cellulose triacetate. A methyl ethyl ketone/ethanol mixture would then be a preferred solvent.

After coating of the liquid coating composition, preferably by spin coating, the optical film with the coated layer is submitted to a drying step so as to evaporate the solvent, water and lower alcohol formed by the hydrolysis/condensation reaction of the isocyanatoalkyltrialcoxysilane. The drying is preferably carried out by heating the coated optical film to a temperature comprised in the range of 80 to 120° C., for a period of time comprised in the range of 0.5 hour to 2 hours.

The liquid coating composition advantageously has a total solids content comprised between 2 and 20% by weight, preferably between 3 and 15% by weight, and is preferably coated in step (a) in an amount leading to a dried image-receiving layer thickness of between 1 µm and 50 µm.

The dried coated optical film can then directly be printed on by means of any conventional thermal transfer printing system, preferably in a thermal transfer sublimation photoprinter.

The sublimable dyes for use in the present invention include sublimable disperse dyes, oil soluble dyes and basic dyes which sublimate at a temperature more than about 60° C.

Specific examples of sublimable dyes are

C.I. Disperse Yellow 1, 3, 8, 9, 16, 41, 54, 60, 77, and 116,

C.I. Disperse Reds 1, 4, 6, 11, 15, 17, 55, 59, 60, 73, and 83,

C.I. Disperse Blues 3, 14, 19, 26, 56, 60, 64, 72, 99, and 108,

C.I. Solvent Yellows 77 and 116,

C.I. Solvent Reds 23, 25 and 27,

C.I. Solvent Blues 36, 63, 83 and 105.

Unlike the prior art printing methods described in U.S. Pat. No. 5,393,725 and U.S. Pat. No. 5,834,398, the method of the present invention comprises a step (d) wherein the optical film with the image-receiving layer is submitted, after the thermal transfer printing step (c), to an additional heating step so as to transfer the printed sublimation dye from the image-receiving layer to the underlying optical film. Part or all of the dye can be transferred to the optical film. The image-receiving layer is not necessarily depleted of dye after the thermal treatment of step (d).

The optical film with the printed image-receiving layer obtained at step (c) are preferably heated to a temperature comprised in the range of 130° C. to 170° C., preferably of 140° C. to 160° C., for a period of time comprised in the range of 1 to 3 hours, preferably of 90 to 150 minutes. The higher the temperature and the longer the heating step, the more sublimation dye will be transferred from the image-receiving layer to the underlying optical film.

After this second thermal transfer step, the image-receiving layer is removed from the optical film by washing with a solvent such as described above. This washing step (e) may further comprises ultrasonification.

To the applicant's best knowledge, the resulting tinted optical films containing sublimation dyes in the optical film itself and not in an image-receiving layer covering the optical film have not been described before and consequently are also a subject-matter of the present invention.

The same applies of course also to any optical article comprising such a tinted optical film adhered to at least one of its surfaces. Adhesion may be obtained for example by means of any known pressure sensitive adhesive or hot melt adhesive, provided this adhesive will not significantly decrease the transparency of the resulting article.

Said optical article is preferably a lens and even more preferably an ophthalmic lens.

Finally, the present invention is also drawn to a liquid coating composition for implementing the method described above, said composition comprising, in a water miscible organic solvent, preferably acetone,
- 1 part of cellulose acetate butyrate (CAB),
- 0.1 to 2 parts by weight, preferably 0.15 to 1 part by weight, of dicyclohexyl phthalate,
- 0.1 to 1 part by weight, preferably 0.15 to 0.8 part by weight, of isocyanato-alkyltrialcoxysilane, preferably isocyanatopropyltriethoxysilane, and
- at least 0.5 moles, preferably from 0.8 to 5 moles, of $H_2O$ per mole of hydrolysable alcoxy groups of isocyanatoalkyltrialcoxysilane.

EXAMPLES

Four liquid coating composition (Formulations 1 to 4) with variable isopropyltriethoxysilane (IPTEOS) concentrations are prepared by dissolving 1 g of cellulose acetate butyrate (CAS-No. 9004-36-8, product number 180963 or 419052, from Sigma-Aldrich), 0.25 g of dicyclohexyl phthalate (CAS-No. 84-61-7, product number 306150 from Sigma-Aldrich) and from 0 to 0.75 g of IPTEOS in 12.5 ml of technical grade acetone having a water content sufficient to hydrolyse all of the ethoxy groups of IPTEOS.

Said Formulations 1 to 4 are then spin-coated onto 80 µm PET films to a dry layer thickness of 50 µm.

After drying, the films coated with an image-receiving layer were uniformly printed in with a brown sublimation dye by means of a Cannon Selphy CP760 photo-printer.

The printed samples were then submitted to a heat treatment for 2 hours at 150° C. The image receiving layer is then removed by washing in acetone.

The below table shows the transmission values (Tv), as defined in ISO 13666:1998, and haze values (H) (both measured by means of a Haze Guard XL-211 plus meter using the standard method ISO 8930-3 (wavelength range from 380 nm to 780 nm) for transmission values and ASTM D 1003-00 for haze values) of the optical film at different stages of the above process, i.e.
(a) after spin coating and drying of the liquid coating compositions (Formulations 1 to 4),
(b) after printing with a Cannon Selphy CP760 photo-printer,
(c) after 2 hours heat treatment at 150° C., and
(d) after removing the temporary dye-receiving layer by washing with acetone.

| Formulation | IPTEOS/g of CAB | (a) after spin coating Tv(%) | H | (b) after printing Tv(%) | H | (c) after heat treatment Tv(%) | H | (d) after washing Tv(%) | H |
|---|---|---|---|---|---|---|---|---|---|
| 1 | — | 93.9 | 15.0 | 44.8 | 2.2 | 43.9 | 26.0 | 58.1 | 0.89 |
| 2 | 0.25 g | 96.0 | 23.3 | 31.6 | 2.2 | 31.7 | 15.6 | 47.8 | 0.91 |
| 3 | 0.5 g | 95.5 | 2.1 | 19.0 | 1.9 | 18.8 | 25.8 | 23.6 | 0.69 |
| 4 | 0.75 g | 94.4 | 0.23 | 12.2 | 2.2 | 13.0 | 24.7 | 28.5 | 0.86 |

The image-receiving layer prepared without any IPTEOS presented insufficient mechanical strength and was partly delaminated from the underlying PET film during the printing step.

The image-receiving layers prepared with 0.25 g, 0.5 g and 0.75 g of IPTEOS per gram of CAB presented a good adherence to the PET film and were not damaged during the printing step in the photo-printer.

The above table shows that the increase of the IPTEOS concentration in the liquid coating composition decreases transmission, i.e. increases colour intensity, of the final red tinted PET films.

The invention claimed is:

1. A method for tinting optical films comprising the following successive steps:
   (a) coating onto an optical film a liquid composition including,
      1 part of cellulose acetate butyrate (CAB);
      0.1 to 2 parts by weight, of dicyclohexyl phthalate;
      0.1 to 1 part by weight, of isocyanato-alkyltrialcoxysilane;
      at least 0.5 moles of $H_2O$ per mole of hydrolysable alcoxy groups of isocyanatoalkyltrialcoxysilane; and
      a water-miscible organic solvent,
   forming a dried image-receiving CAB layer on the optical film by drying the coated compositi
   (c) thermal transfer printing on the dried image-receiving CAB layer with a sublimation dye;
   (d) transferring the sublimation dye from the image-receiving CAB layer to the underlying optical film by a thermal treatment; and
   (e) removing the image-receiving CAB layer by a suitable solvent.

2. The method according to claim 1, wherein the isocyanatoalkyltrialcoxysilane is isocyanatopropyltriethoxysilane.

3. The method according to claim 1, wherein the water miscible organic solvent of step (a) and the solvent used in step (e) are independently selected from the group consisting of acetone, methyl ethyl ketone, ethyl acetate, and tetrahydrofurane.

4. The method according to claim 1, wherein the optical film is a film of poly(ethylene terephthalate).

5. The method according to claim 1, wherein the dried image-receiving layer has a thickness of between 1 µm and 50 µm.

6. The method according to claim 1, wherein the thermal treatment comprises heating the optical film and printed image-receiving layer to a temperature in the range of 130° C. to 170° C., for a period of time of 1 to 3 hours.

7. The method according to claim 1, wherein the printing is carried out by a thermal transfer printer in step (c).

8. The method of claim 7 wherein the thermal transfer printing is carried out by a sublimation photo-printer.

9. The method according to claim 1, wherein the removing step (e) further comprises ultrasonification.

10. The method according to claim 1, wherein the coating step (a) is a spin coating step.

11. The method according to claim 1, wherein the liquid composition coated in step (a) has a total solids content of between 2 and 20% by weight.

* * * * *